(12) United States Patent
Udupi Raghavendra et al.

(10) Patent No.: US 11,886,587 B2
(45) Date of Patent: Jan. 30, 2024

(54) MALWARE DETECTION BY DISTRIBUTED TELEMETRY DATA ANALYSIS

(71) Applicant: KYNDRYL, INC., New York, NY (US)

(72) Inventors: Arjun Udupi Raghavendra, Zurich (CH); Tim Uwe Scheideler, Schoenenberg (CH); Matthias Seul, Pleasant Hill, CA (US); Andrea Giovannini, Zurich (CH)

(73) Assignee: KYNDRYL, INC, New York, NY (US)

( * ) Notice: Subject to any disclaimer, the term of this patent is extended or adjusted under 35 U.S.C. 154(b) by 589 days.

(21) Appl. No.: 17/069,189

(22) Filed: Oct. 13, 2020

(65) Prior Publication Data

US 2022/0114260 A1      Apr. 14, 2022

(51) Int. Cl.
*G06F 21/56* (2013.01)
*G06F 21/57* (2013.01)
(Continued)

(52) U.S. Cl.
CPC .......... *G06F 21/566* (2013.01); *G06F 18/217* (2023.01); *G06F 21/53* (2013.01);
(Continued)

(58) Field of Classification Search
CPC ...... G06F 21/566; G06F 18/217; G06F 21/53; G06F 21/577; G06F 2221/033; G06N 3/045
See application file for complete search history.

(56) References Cited

U.S. PATENT DOCUMENTS 8,306,931 B1   11/2012  Bowman
8,745,361 B2    6/2014  Shah
(Continued)

FOREIGN PATENT DOCUMENTS

CN    108092962 A  *  5/2018  ......... H04L 63/1425
CN    109635563        4/2019
(Continued)

OTHER PUBLICATIONS

Dataman, "Anomaly Detection with Autoencoders Made Easy", Oct. 26, 2019, Medium, 22 pps., <https://towardsdatascience.com/anomaly-detection-with-autoencoder-b4cdce4866a6>.
(Continued)

*Primary Examiner* — Bassam A Noaman
(74) *Attorney, Agent, or Firm* — Dan Housley; Andrew M. Calderon; Calderon Safran & Cole P.C

(57) ABSTRACT

Aspects of the present invention disclose a method, computer program product, and system for detecting a malicious process by a selected instance of an anti-malware system. The method includes one or more processors examining a process for indicators of compromise to the process. The method further includes one or more processors determining a categorization of the process based upon a result of the examination. In response to determining that the categorization of the process does not correspond to a known benevolent process and a known malicious process, the method further includes one or more processors executing the process in a secure enclave. The method further includes one or more processors collecting telemetry data from executing the process in the secure enclave. The method further includes one or more processors passing the collected telemetry data to a locally trained neural network system.

20 Claims, 10 Drawing Sheets

(51) Int. Cl.
  *G06F 21/53* (2013.01)
  *G06F 18/21* (2023.01)
  *G06N 3/045* (2023.01)

(52) U.S. Cl.
  CPC ......... *G06F 21/577* (2013.01); *G06N 3/045* (2023.01); *G06F 2221/033* (2013.01)

(56) References Cited

U.S. PATENT DOCUMENTS

| | | | |
|---|---|---|---|
| 8,881,282 | B1 | 11/2014 | Aziz |
| 9,195,833 | B2 | 11/2015 | Chestna |
| 9,916,440 | B1* | 3/2018 | Paithane ............. G06F 21/53 |
| 10,148,686 | B2 | 12/2018 | Hassanzadeh |
| 2007/0294768 | A1 | 12/2007 | Moskovitch et al. |
| 2012/0198552 | A1* | 8/2012 | Alagna ............. G06F 21/554 726/23 |
| 2012/0278892 | A1* | 11/2012 | Turbin ............. G06F 21/53 717/171 |
| 2015/0295945 | A1 | 10/2015 | Canzanese, Jr. |
| 2015/0347747 | A1 | 12/2015 | Yancey |
| 2017/0034192 | A1* | 2/2017 | Schulman ........ H04L 63/1416 |
| 2018/0268142 | A1 | 9/2018 | Sethumadhavan |
| 2019/0312894 | A1 | 10/2019 | McGrew |
| 2019/0319977 | A1 | 10/2019 | Gottschlich |
| 2019/0370638 | A1* | 12/2019 | Green ................. G06N 3/08 |
| 2020/0090002 | A1* | 3/2020 | Zhu .................. G06N 3/088 |
| 2020/0134447 | A1* | 4/2020 | Bennett .............. G06N 3/044 |
| 2021/0365841 | A1* | 11/2021 | Shaloudegi ......... G06N 20/20 |
| 2022/0076133 | A1* | 3/2022 | Yang ................. G06N 3/044 |

FOREIGN PATENT DOCUMENTS

| | | |
|---|---|---|
| CN | 111260053 | 6/2020 |
| CN | 111368297 | 7/2020 |

OTHER PUBLICATIONS

Luo et al., "Distributed Anomaly Detection Using Autoencoder Neural Networks in WSN for IoT", ResearchGate, May 2018, 7 pps., <https://www.researchgate.net/publication/327129141_Distributed_Anomaly_Detection_Using_Autoencoder_Neural_Networks_in_WSN_for_IoT>.

Nguyen et al., "DIoT: A Federated Self-learning Anomaly Detection System for IoT", Paper accepted to the 39th IEEE International Conference on Distributed Computing Systems (ICDCS 2019), May 10, 2019, 12 pps., <https://arxiv.org/pdf/1804.07474.pdf>.

Preuveneers et al., Chained Anomaly Detection Models for Federated Learning: An Intrusion Detection Case Study, Applied Sciences, 21 pps., Published: Dec. 18, 2018, <https://www.mdpi.com/2076-3417/8/12/2663>.

International Search Report and Written Option of the International Searching Authority from PCT Application No. PCT/CN2021/120874 dated Dec. 30, 2021, 9 pages.

* cited by examiner

MALWARE DETECTION BY DISTRIBUTED TELEMETRY DATA ANALYSIS

BACKGROUND OF THE INVENTION

The present invention relates generally to the field of malware detection, and more particularly to detecting a malicious process by a selected instance of an anti-malware system.

For years, cyber security attacks remain among the top priorities of government organizations and information technology (IT) organizations and enterprises. The role of the chief information security officer (CISO) is a given in any IT organization. Most of the security information and event monitoring (SIEM) solutions available on the market require a set of complex correlation rules monitored and tuned by highly skilled personnel, in order to identify and detect potential security threats that can lead to security incidents in at least a part of an organization. According to the general and data security regulation (GDPR), companies operating in the European Union may face high monetary fees the companies fail to protect customer and/or employee data. However, protecting enterprise data is not only a topic for European-based enterprises and government organizations but for all entities dealing with data around the world.

Typically, malware may be received via a network connection or a locally attached storage medium and may be activated by some sort of event. For example, a program is started in the computing environment (i.e., as a process of the operating system). One way to control such potentially unallowed processes is known as sandboxing, in which unknown processes can be executed in a protected environment (i.e., a processing environment not infecting the remaining processes, operating system, and data) and potentially be eliminated without causing any harm to the underlying computing system. Often, malware sandboxing and execution of unknown files/processes is implemented as a centralized sandbox, usually in a virtual appliance where the unknown files and codes are executed to understand the behavior of the unknown files and process execution, and also collect Indicators of Compromise (IoC) related to unknown malware and to further analyze malware behavior.

Such central implementations can also create a problem because the central malware sandboxing system can become a bottleneck for testing of unknown file executions because parallel secure enclave executions of unknown files can require a more powerful CPU, more memory, and potentially also larger storage. A central implementation can also limit the size and capabilities of centralized sandboxes because the amount of system resources for parallel secure enclave executions may grow over-proportional.

In addition, advanced malware can detect even a centralized sandbox execution and can mask the malware behavior as legitimate processes. Accordingly, in the development of centralized sandbox systems for malware analysis and unknown file/process there is a high risk of bottlenecking and the amount of available system resources required in return to the number of secure enclave executions performed by the centralized sandbox system can be minuscule.

The document US 2019/0319977 A1 discloses an apparatus, a system, and methods for fingerprinting and classifying application behaviors using telemetry. An example apparatus includes a trace processor to process events in a processor trace to capture application execution behavior as well as a fingerprint extractor to extract a first fingerprint from the captured application execution behavior and performance monitor information.

Additionally, the document U.S. Pat. No. 10,148,686 B2 discloses systems, methods, and computer programs for analyzing telemetry data from physical process sensors to detect a number that is within the physical process. A telemetry analytics system is disclosed as a process level anomaly detection system based on operational telemetrics and domain-specific knowledge that protects cyber physical system devices against zero-day exploits not detectable through other system log or network packet inspection.

The problems with centralized sandboxing, however, are that centralized sandboxing may require too much resources of a host system. Therefore, there may be a need to overcome this bottleneck and to provide a method for identifying malicious processes on a host which may (i) not be detectable by traditional malware detection systems and (ii) require significantly less resources than centralized sandboxing approaches.

SUMMARY

Aspects of the present invention disclose a method, computer program product, and system for detecting a malicious process by a selected instance of an anti-malware system. The method includes one or more processors examining a process for indicators of compromise to the process. The method further includes one or more processors determining a categorization of the process based upon a result of the examination. In response to determining that the categorization of the process does not correspond to a known benevolent process and a known malicious process, the method further includes one or more processors executing the process in a secure enclave. The method further includes one or more processors collecting telemetry data from executing the process in the secure enclave. The method further includes one or more processors passing the collected telemetry data to a locally trained neural network system. The training data of the locally trained neural network system comprises telemetry data from processes being executed on a host system underlying the locally trained neural network system. The method further includes one or more processors determining a result of a first loss function for the locally trained neural network system. The method further includes one or more processors comparing the result with a result of said loss function at an end of a training of said locally trained neural network system.

In a further aspect, the method further includes one or more processors passing the collected telemetry data to a federated trained neural network system. The federated trained neural network system is adapted to receive a federated trained neural network model. The method further includes one or more processors determining a result of a second loss function for the federated trained neural network system. The method further includes one or more processors comparing the result with a result of the loss function of the received federated trained neural network model of the federated trained neural network system. The method further includes one or more processors aggregating results of the first loss function and the second loss function. The method further includes one or more processors determining whether the process is anomalous based on the aggregated results.

The proposed method for detecting a malicious process by a selected instance of an anti-malware system may offer multiple advantages, technical effects, contributions and/or improvements.

Firstly, a single centralized approach for detecting malicious processes may be avoided. Hence, the required system resources to detect malicious processes may be reduced significantly if compared to traditional approaches. Hence, the amount of central processing unit (CPU) power, memory, and storage required to implement highly sensitive intrusion detection systems on a specific host may be reduced.

The use of telemetry data in addition to traditional detection of indicators of compromise may be tuned to individual environments assigning different weights to different components of the telemetry data. Additionally, the telemetry data may have static components as well as dynamic components which may be expanded quickly if new methods for deriving process telemetry data and computing environments may become available. The underlying process of using auto-encoders for detecting potentially malicious pattern in the processes can thereby remain unchanged.

The option of a periodic retraining of the local and federated trained neural network systems using separate trained neural network models may enable a quick adoption to the newly available telemetry data patterns.

Additionally, the combined knowledge of the plurality of selected instances of a malware detection system in form of a federated trained neural network model using the combined "experience" of each of the individual instances of the locally trained neural network systems and the related neuron network models may achieve two goals. Firstly, an analysis of process parameters (i.e., telemetry data) of a plurality of host systems may be performed in a distributed way such that no central instance may be overburdened by too many data to be processed in a limited amount of time. Secondly, telemetry data from different processing environments (i.e., processor types, amount of available memory and storage workload amounts and workload types, etc.) may be taken into account for training of the federated neuronal network model. Once developed, and also updated regularly, the federated trained neural network model may be distributed again to the plurality of selected instances of the malware detection system to be used in the federated trained neuronal network systems.

Accordingly, such aspects of the present invention can render the here proposed method and related system adaptable, comparably easy to implement, expandable and flexible because resources of different hosts in combination with a central instance may be used without overloading the central instance and capturing analysis data from the local instances. However, and on the other side, the local instances are not completely dependent on a central instance (i.e., the training environment for the federated neural network model) but have local resources available in form of the locally trained neural network system and the federated trained neural network system to defend the corresponding computing environment against malicious processes. Accordingly, a "central cyber-attack defense intelligence" and local protection systems may be combined in a powerful and unique way.

In addition, aspects of the present invention can operate to detect and eliminate advanced malware capable of detecting centralized sandbox execution and also capable of masquerading the malware behavior with legitimate process behaviors. Accordingly, this goal may be achieved with the limited resources of a selected instance of a federated backbone of the malware detection system.

In the following, additional embodiments of the inventive concept, applicable to the method as well as to the related computer system and computer program product, are described.

In another aspect, the method further includes one or more processors collecting telemetry data of non-malicious processes being executed on a selected instance of an anti-malware system. The method further includes one or more processors retraining the locally trained neural network system with the collected telemetry data to build an updated local neural network model on a regular basis. Thereby, non-malicious processes are processes that are executed on a regular basis on the host under the control of the operating system. The non-malicious processes may be operating system processes or processes of application programs. On typical host systems, hundreds and thousands of such processes may be executed in parallel every second. The collection of the telemetry data may also be supported by systems management tools. Alternatively, the data can also be solely be collected using components of a computer security framework. The corresponding generated telemetry data of non-malicious (i.e., regular) processes may be used at predefined points in time (e.g., periodically or based on a triggering event) to retrain the local neural network model of the local neural network system. Accordingly, changing workloads and telemetry data profiles, which may change over time, can be reflected in the behavior of the local neural network model.

In addition, the method further includes one or more processors receiving an updated federated neural network model for the federated neural network system. The federated neural network model is built using locally trained neural network models of a plurality of selected instances as input. Thereby, the federated neural network model may be built using locally trained neural network models of a plurality of selected instances as input. Hence, the collective, cooperative "knowledge" of a plurality of hosts and their related malware detection methods and systems, which may be a target of malware attacks of different profiles, may become the basis for a group-wide "immunization" in respect to different types of cyber-attacks.

Further, at least one of the locally trained neural network systems and the federated trained neural network system is an auto-encoder system. Auto-encoders can be particularly well-equipped to support the proposed concept. Since the number of artificial neurons (or nodes) of the input layer of the respective neural network is equal to the number of artificial neurons of the output layer, aspects of the present invention can operate to apply and minimize a result of a loss function based on a difference between the input layer and the output layer. However, the minimum may be reached, or the loss function results may be in the range of the minimum value, if input values to the neural network may be comparably close to the used training telemetry data. If other telemetry data outside the range of the training telemetry data that may be applied to the input layer of the respective neural network, then the loss function may show a value larger than a predefined threshold indicating that a potential malicious process is present.

In another aspect, in response to determining that the categorization of the process corresponds to an anomalous process, the method further includes one or more processors discarding the process. Accordingly, processes based on potential malware program code may not leave the secure enclave and potentially in fact other processes or manipulate data of the host computing system in an unallowable manner.

In another aspect, in response to determining that the process is a regular process, based on execution in the secure enclave, the method further includes one or more processors moving the process out of the secure enclave. The method further includes one or more processors executing the process as a regular process. Accordingly, the process may be executed as a regular process being controlled by the operating system and potentially also being a basis for a generation of additional telemetry data of a regular process.

In an additional aspect, the federated trained neural network system is trained with telemetry data from a plurality of hosts. For example, the method can operate to send locally trained neural network models (i.e., from the respective local hosts) (e.g., in form of corresponding parameters and hyper parameters) from the respective local hosts to a centralized system, such as operated on a cloud computing system.

Further, the method for training of the federated neural network system further comprises one or more processors processing, by each of a plurality of received locally trained neural network models, a set of representative telemetry data and storing respective results; and one or more processors training the federated neural network using input/output pairs of telemetry data used and generated during processing of the telemetry data as input data for a training of the federated neural network model. The input/output pairs of telemetry data used for the training of the federated neural network model are weighted depending on a geographical vicinity between geographical host locations of the local received neural network models and a geographical host location for which a new federated neural network model is trained. Also, the input/output pairs of telemetry data used for the training of said federated neural network model are weighted depending on a predefined metric.

Thereby, local specifics of individual host systems and corresponding federated trained neural network models may be reflected. Embodiments of the present invention recognize that cyber-attacks of a certain profile are often directed to specific geographic regions. The proposed concept allows such peculiarities to be well reflected by the malware detection system, which can increase the sensitivity to a certain type of cyber-attack and may also advantageously save system resources. Accordingly, the individual federated trained neural network models on different hosts may differ in such an embodiment.

In an example embodiment, 10 instances may each send a respective local neural network model to a central service of the malware detection system. The respective geographic locations may also be known. Then, for example, the process for a training of the federated neural network model for instance 3 would (i) assess distance information between instance 3 and all the other 9 instances, and (ii) processing, by the received locally trained neural network models, a set of representative telemetry data and store respective results (as described above), and (iii) repeating the use of input/output pairs with inverse proportionality to the distance determined under step (i).

In an additional example aspect, if one considers a pair coming from instance 5, which is geographically very close to instance 3, the pair may be repeated 10 times (predefined number of times) during training (i.e., giving the network a bias); instead, if one considers a pair coming from instance 7, which is for example 10 times further away, then the value pair will appear only once in the training data.

According to another embodiment of the method, the input/output pairs of telemetry data used for the training of the federated neural network model may be weighted depending on a predefined metric. The weighting may allow not only to reflect geographical locations and its specifics in terms of potential cyber-attacks but also other profiles of the local hosts. For example, a usage within a certain vertical industry, a specific department, a type of host computer (e.g., central system enterprise computing system vs. Internet-of-Things (IoT), system or personal device). Further, the weighting can enable an improved protection depending on more tunable parameters against malware resulting in potentially malicious processes.

According to another embodiment of the method, the aggregating the results of the loss functions may comprise building a weighted average of the loss functions, which may reflect that the respective weight factor values may be adjusted according to the amount of data seen by the federated trained neural network system (e.g., central, auto-encoder) versus the locally trained neural network model (e.g., local auto-encoder). Hence, the "more experienced" auto-encoder may have a "larger influence."

In another aspect, the method for aggregating results of the first loss function and the second loss function further comprises one or more processors building a weighted average of the first loss function and the second loss function. In an additional aspect, the determined categorization is selected from the group consisting of: a known benevolent process, a known malicious process, and an unknown process.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

The aspects defined above, and further aspects of the present invention, are apparent from the examples of embodiments to be described hereinafter and are explained with reference to the examples of embodiments, but to which the invention is not limited. Preferred embodiments of the invention will be described, by way of example only, and with reference to the following drawings.

DETAILED DESCRIPTION

Figure 1:
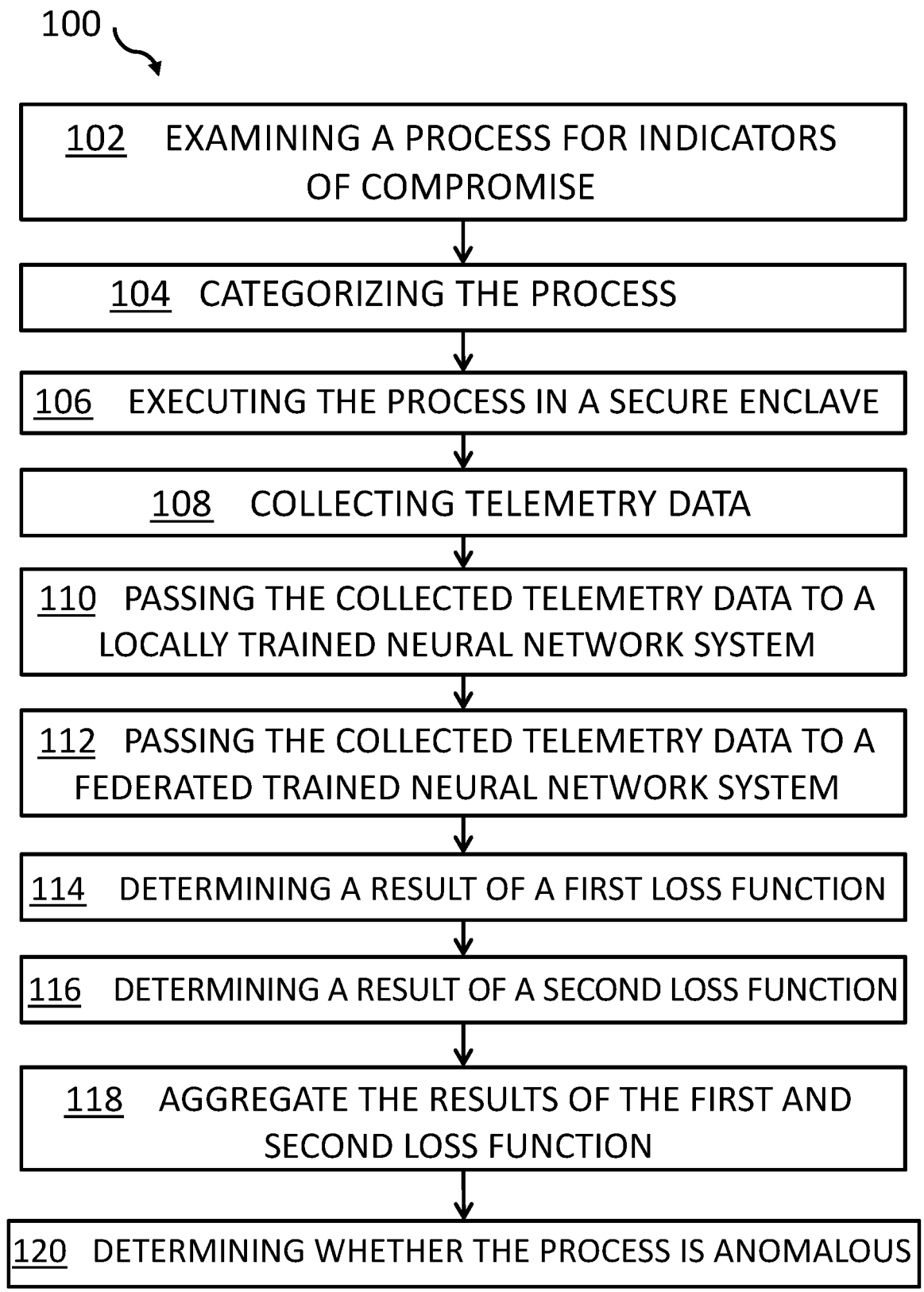
FIG. 1 depicts a block diagram of an embodiment of a method for detecting a malicious process by a selected instance of an anti-malware system, in accordance with embodiments of the present invention.

In the following, a detailed description of the Figures will be given. All instructions in the Figures are schematic. Firstly, a block diagram of an embodiment of the inventive method for detecting a malicious process by a selected instance of an anti-malware system is given. Afterwards, further embodiments, as well as embodiments of the malware detection system for detecting a malicious process by a selected instance of an anti-malware system, will be described.

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

In the context of this description, the following conventions, terms and/or expressions may be used.

The term 'malicious process' may denote and relate to any computer code related activity on a computing system compromising the operating integrity of the computing system and the operating system and regular applications of the computer system. The malicious process may be based on data/computer code received on the host system (i.e., the computing system). Hence, any anomalous or non-regular process (i.e., a process on purpose being executed under control of the operating system) may be categorized as malicious process. Malicious processes may alter data on the computing system, observe or spy on data on the computing system, alter any function of the computing system in an unintended way, etc.

The term 'selected instance' may denote a computing system or host being part of the anti-malware system. The selected instance may also be denoted as local host.

The term 'anti-malware system' may denote a plurality of selected instances working in cooperation with a central instance supporting functions of the local instances for a better protection against cyber-attacks.

The term 'indicators of compromise' (in short, IoC) may denote the well-known concept in computer forensics and may denote an artifact observed on a network or in an operating system that, with high confidence, may indicate a computer intrusion. Types of indicators of compromise may comprise virus signatures, known suspect Internet Protocol (IP) addresses, MD5 hash values of malware files, uniform resource locators (URLs) of domain names of botnet command and control servers, etc. After identifying IoCs via a process of incident response and/or computer forensics, embodiments of the present invention can utilize the IoCs for an early detection of future attacks using intrusion detection systems and/or antivirus software.

The term 'known benevolent process' may denote, in contrast to a malicious process, a process in an operating system that is with high confidence non-damaging to the operating system in any way. For example, a known benevolent process can be started by the operating system on purpose as part of the operating system or related application software program. A known benevolent process may also relate to received program code over a network from a secure source.

The term 'known malicious process' may denote a process in an operating system which may, with high confidence, compromise the operating system or the underlying computing system. In various aspects, a known malicious process can be identified using IoCs.

The term 'unknown process' may denote a process in an operating system that is not classified as a malicious process or as a regular/secure process.

The term 'secure enclave' may denote a secure sandbox computing environment that can protect the regular operating environment of the computing system and/or the respective operating system and its applications.

The term 'telemetry data' may denote at least two classes of character arising data of an executing process: (a) static telemetry data and (b) dynamic telemetry data. Static telemetry data relates to those data for a process addressed (i.e., the program code defining a not yet executed process). Static telemetry data may include at least (i) a determined file hash value of the executable file to fingerprint the files (ii) string extraction for string analysis from the executable file, (iii) layout extraction of the executable file, and (iv) an automated disassembly of code and code structure of the executable file. In contrast, dynamic telemetry data may be observed and data of an executing process. The dynamic telemetry data can include at least: (i) system monitoring data, (ii) registry activity data, (iii) file (i.e., file access) activity data, (iv) process activity data, and (v) network activity data. Accordingly, the dynamic telemetry data may change over the lifetime of the process and may show a characteristic profile.

Thereby, often known technologies are used. As examples, the following should be mentioned. String extraction is one of the first things to do to briefly extract useful information, such as IP address, domains, functions, data, or any other information that has not been removed by the malware developer. Thereby, a string is meant to be a sequence of characters and may be a constant or a variable. A string is a type of data and can be implemented as a byte (or word) data structure that stores a sequence of elements. Strings are inherent in computer programming and are basically valuable data that is used to create software and, in turn, to get clues about functionality during reverse engineering. Extraction of layout focuses on checking the header of an executable program code to map the information about the code, type of application, required library functions, and space requirements of the potential malware. The file hashing that is done initially to fingerprint the malware executable is typically not suited to extract the details mentioned in this step as, for example, the file hashing is for an MD5 extract of the malware file. An automated disassembly of code and code structure may be performed by known or to be developed tools, which may quickly do a disassembly of code. Common tools used for this an interactive disassembler, for static malware analysis.

The term 'locally trained neural network system' may denote a neural network system using locally available training data (e.g., locally generated telemetry data of regular processes) to develop a neural network model. The neural network model and/or neural network system may be constructed according to the rules of an auto-encoder neural network. However, also other neural network types may be used advantageously.

The term 'host system' may denote a computing system also denoted as selected instance within malware detection system.

The term 'federated trained neural network system' may denote a neural network system comprising an underlying neural network model being trained on a central instance malware detection system. A federated trained neural network system may be operated as a cloud service and may provide supporting malware detection and protection services to a plurality of local instances or host systems.

The term 'first loss function' may denote a function returning a result value or a result vector if input values to a neural network (e.g., an auto-encoder) are compared to respective output values. In particular, for an auto-encoder, the output values may always differ more or less from the respective input values (e.g., because not any auto-encoder has an underlying idea and perfect model). The first loss function may relate to a trained local neural network system, whereas the second loss function may relate to the federated trained neural network system, which may also be an auto-encoder.

The term 'updated federated neural network model' may denote a new federated neural network model being retrained with new training data. The updated federated neural network model can then be distributed to the connected local instances working in cooperation and data exchange with a central system of the malware detection and protection system.

The term 'auto-encoder' may denote a specific type of an artificial neural network used to learn efficient data codings in an unsupervised manner. Thereby, the aim of an auto-encoder is to learn a representation (i.e., encoding) of a set of data, typically for dimensionality reduction, by training the neural network to ignore signal "noise." Along with the reduction side, a reconstruction side is also trained (i.e., learned), where the auto-encoder tries to generate from the reduced encoding a representation as close as possible to an original input.

The term 'regular process' may denote a process of an operating system being initiated and/or controlled by the operating system. For example, an operating system internal process or an intended process relating to an application.

The term 'loss functions' may denote, in its simplest form, a difference between an output value and an input value (e.g., from a neural network system, an auto-encoder, etc.). Embodiments of the present invention recognize that loss functions are widely used in artificial intelligence (AI) systems.

Embodiments of the present invention provide a method to secure a host (i.e., computer system running processes) from adverse effects of malware. Malware reaches the host via a network connection (e.g., as an email attachment, as program download, app or applet in a web browser, etc.).

Embodiments of the present invention can utilize local sandboxing of unknown processes for anomaly detection. Incoming network traffic is first subject to an initial check for Indicators of Compromise (IoC). For example, known malicious IP addresses or virus signatures. In case the process is neither a known benevolent process nor a known malicious process, embodiments of the present invention can allow the process to execute, but kept initially in a secure enclave, i.e., the sandbox.

The concept also comprises a decision-making method (performed locally on the host) to identify whether a process is malicious or not. Malicious processes are discarded; non-malicious processes are moved out of the sandbox and executed as a regular process.

In various embodiments, each local host runs two anomaly detectors or systems: the first uses a federated machine learning model built from process telemetry data contributed by telemetry extractors running on all the hosts sharing the fundamental concept of the here proposed inventive idea, the second using a machine learning model built from local extracted process telemetry data. In an example embodiment, s the anomaly detector is an auto-encoder. However, other machine learning implementations are possible. The machine learning models (MLMs) are trained with telemetry data from regular (non-anomalous) processes (i.e., the MLMs describe the range of characteristics of telemetry data of regular processes). Deviations from this range are regarded as anomalies.

Embodiments of the present invention recognize that a challenge with this approach is to control the false positive rate (i.e., the relative amount of cases where regular processes are erroneously classified as malware) and on the other hand side, to prevent that malware from passing as a regular process. Both, a high false positive rate and malware slipped through, greatly affect the effectiveness of a security system. The method of using a dual anomaly detector allows the introduction of sensitivity factors to adjust and optimize the true positive/false positive rate.

Various embodiments of the present invention recognize that, for years, cyber security attacks remain among the top priorities of government organizations and information technology (IT) organizations and enterprises. The role of the chief information security officer (CISO) is a given in any IT organization. Embodiments of the present invention recognize that most of the security information and event monitoring (SIEM) solutions available on the market require a set of complex correlation rules monitored and tuned by highly skilled personnel, in order to identify and detect potential security threats that can lead to security incidents in at least a part of an organization. According to the general and data security regulation (GDPR), companies operating in the European Union may face high monetary fees the companies fail to protect customer and/or employee data. However, protecting enterprise data is not only a topic for European-based enterprises and government organizations but for all entities dealing with data around the world.

Additional embodiments of the present invention recognize that advanced malware can detect even a centralized sandbox execution and can mask the malware behavior as legitimate processes. Accordingly, in the development of centralized sandbox systems for malware analysis and unknown file/process, embodiments of the present invention recognize a high risk of bottlenecking. Embodiments of the present invention also recognize that amount of available system resources required in return to the number of secure enclave executions performed by the centralized sandbox system can be minuscule.

Further embodiments of the present invention recognize that problems with centralized sandboxing, however, are that centralized sandboxing may require too much resources of a host system. Therefore, embodiments of the present invention recognize a need to overcome this bottleneck and to provide a method for identifying malicious processes on a host which may (i) not be detectable by traditional malware detection systems and (ii) require significantly less resources than centralized sandboxing approaches.

In the following, additional embodiments, applicable to the method as well as to the related system will be described.

FIG. 1 shows a block diagram of a preferred embodiment of a method 100 for detecting a malicious (e.g., in particular, anomalous or non-regular) process by a selected instance (i.e., host) of an anti-malware system, in accordance with embodiments of the present invention. For example, in particular an anti-malware system that includes multiple hosts and a central (e.g., cloud based) system used from time to time and if required without being a bottleneck. For the purpose of explanation, the method 100 described in FIG. 1 may be implemented in one or more of the diagrams and systems depicted FIG. in the system illustrated in FIG. 6 (e.g., utilizing components 600), FIG. 7 (e.g., utilizing embodiment 700), FIG. 8 (e.g., utilizing sub-processes 800), FIG. 9 (e.g., utilizing malware detection system 900), and FIG. 10 (e.g., utilizing computing system 1000). Alternatively, execution of method 100 is not limited to this implementation. In example embodiments, malware detection system 900 can perform the method 100 of FIG. 1.

The method 100 comprises examining a process for indicators of compromise (step 102). In example embodiments, the process is related to the program code or data received before. The method 100 also comprises categorizing the process based upon a result of the examination (step 104). In various embodiments, method 100 can classify the process as one selected out of the group comprising a known benevolent process, a known malicious process, and an unknown process.

In step 106, the method 100 comprises executing the process in a secure enclave. In case the process is neither categorized as a known benevolent process nor as a known malicious process, the method 100 executes the process in a secure enclave (i.e., a secure sandbox on the underlying host computing system). Further, the method 100 can operate to determine whether the process is considered malicious or not. In step 108, the method 100 comprises collecting telemetry data. In particular, static and dynamic telemetry data from the executing process under observation (i.e., being executed in the secure enclave).

Furthermore, in step 110, the method 100 comprises passing the collected telemetry data to a locally trained neural network system. In various embodiments, training data of the locally trained neural network system (e.g., to develop a trained neural network model) comprises telemetry data from processes (e.g., non-malicious processes, such as regular processes) being executed on a host system underlying the local instance.

Additionally, in step 112, the method 100 also comprises passing the collected telemetry data to a federated trained neural network system. In example embodiments, the federated trained neural network system is adapted to receive a federated trained neural network model. For example, from a supporting cloud system being part of the malware detection system.

Moreover, in step 114, the method 100 comprises determining a result of a first loss function (e.g., mean square of two vectors) for the locally trained neural network system. Method 100 can then compare the result with a result of the loss function at an end of a training of the locally trained neural network system. Then, in step 116, the method 100 comprises determining a result of a second loss function (e.g., also mean square based) for the federated trained neural network system. Method 100 can then compare the result with a result of the loss function of the received federated trained neural network model of the federated trained neural network system.

Then, the method 100 comprises aggregating the results of the first and second loss function (in step 118). Further, method 100 comprises determining whether the process is anomalous based on the aggregated results (step 120). In various embodiments, the aggregation may use a predefined process in order to determine the aggregated results (see below for an example described in further detail).

Figure 2:
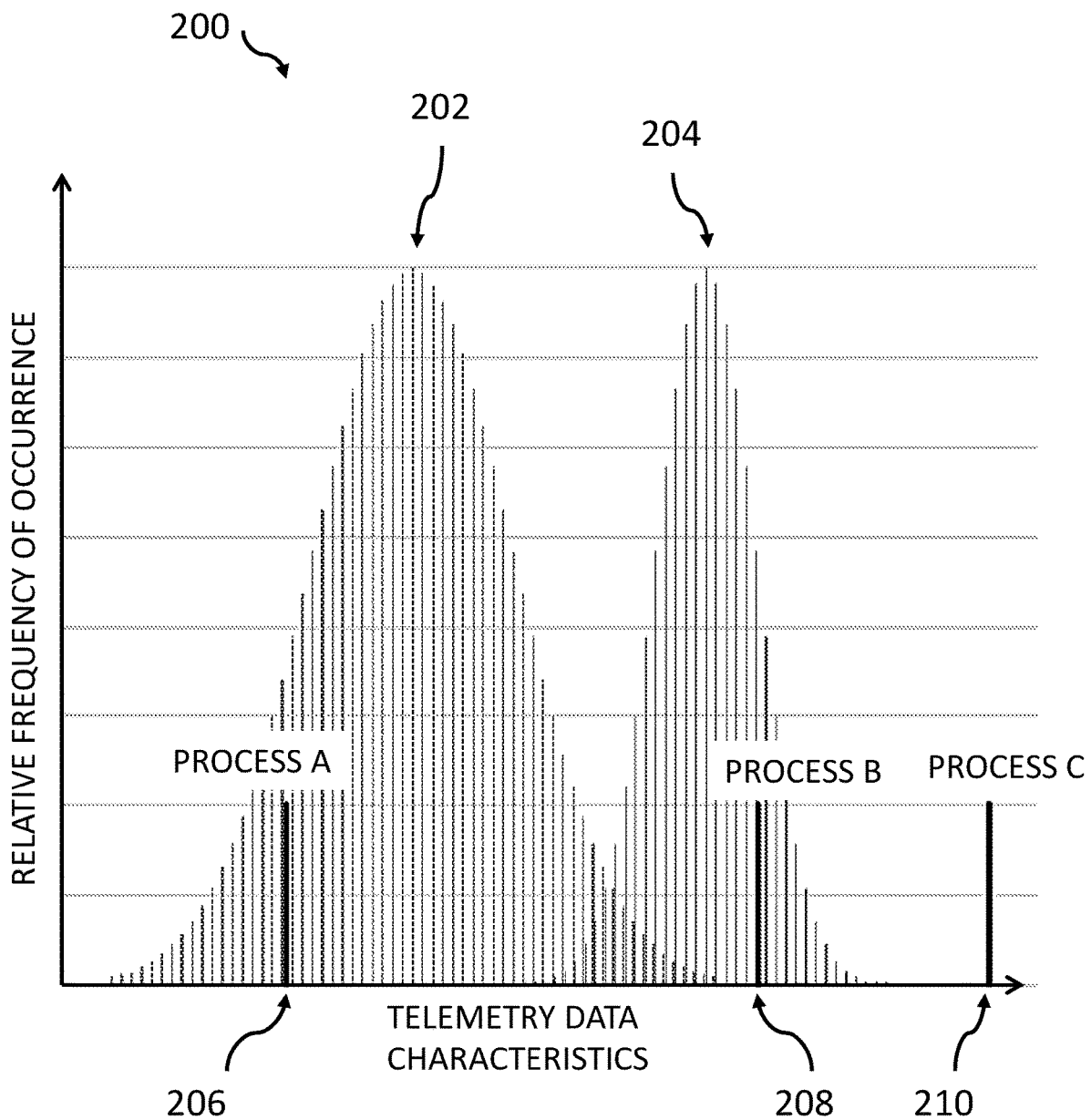
FIG. 2 depicts a diagram illustrating example telemetry data of a non-anomalous processes, in accordance with embodiments of the present invention.

FIG. 2 shows a diagram 200, illustrating telemetry data of the non-anomalous processes. FIG. 2 illustrates a distribution of input telemetry data for the machine learning models (MLMs) of the federated anomaly detector (broader distribution on the left-hand side; federated trained neural network model) and local anomaly detector (narrow distribution, 204, local trained neural network model). The x-axis of the diagram 200 shows categories of telemetry data characteristics, whereas the y-axis of the diagram 200 shows a relative frequency of its occurrences.

In the depicted example of FIG. 2, the closer the characteristics of the telemetry data of a process currently under investigation (in particular, process A (206), process B (208), and process C (210)) is to the center of the distribution (i.e., the top point of the Gaussian curve), the higher is the confidence that the process is regular (i.e. non-malicious).

Embodiments of the present invention recognize that MLMs do not represent the "real world," instead MLMs represent a world based on the input data, which is always biased to some extent. In this example, the characteristics of telemetry data gathered on this specific local host differs from the characteristics gathered across the environment. Process B 208 is indeed a regular process on a local host, despite that Process B is not regarded as a regular process by the federated anomaly detector, due to the different training data. For the avoidance of blocking regular processes on systems with different characteristics, in principle both anomaly detectors must classify a process as anomalous, which is the case with the process C (210). In the depicted example of FIG. 2, process C (210) is outside the limits of the Gaussian curve 202 and the Gaussian curve 204. Using model specific sensitivity parameters and weighting the results among the anomaly detectors (i.e., the respective trained neural network model/system), embodiments of the present invention can operate to improve the true/false positive rate.

Figure 3:
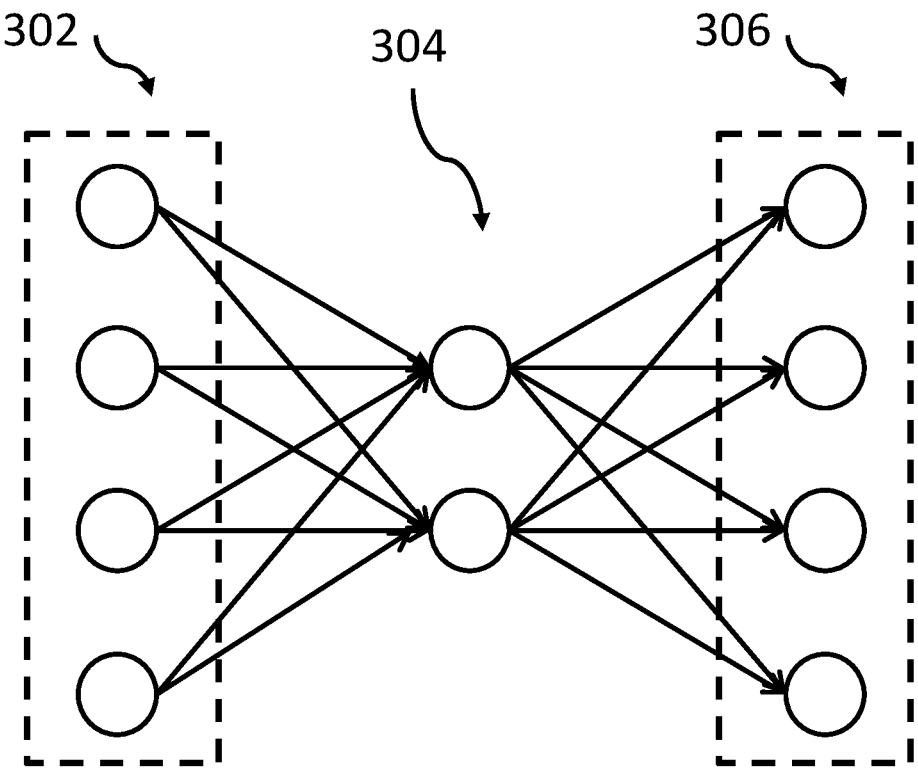
FIG. 3 depicts an exemplary structure of an auto-encoder neural network, in accordance with embodiments of the present invention.

FIG. 3 shows a structure of an auto-encoder 300. In the depicted example, auto-encoder 300 is shown in a typical implementation of a neural network comprising a plurality of layers of nodes. As already described above, an auto-encoder is a type of artificial neural network used to learn efficient data codings in an unsupervised manner. The aim of an auto-encoder is to learn a representation (i.e., encoding) for a set of data, typically for dimensionality reduction, by training the network to ignore signal "noise." Along with the reduction side, a reconstruction side is learned, where the auto-encoder tries to generate from the reduced encoding a representation as close as possible to its original input, hence the name. Thus, after training, the output nodes 306 deliver in the inference phase the same data signals as inputted to the input layer 302. In the depicted example of FIG. 3, each circle represents a node of the neural network or an artificial neural network cell. The auto-encoder 300 is shown with only three layers 302, 304, 306, where the layer 304 is a hidden layer. In general, an auto-encoder may comprise a plurality of hidden layers. However, the number of layers does not change the general function of auto-encoders.

Figure 4:
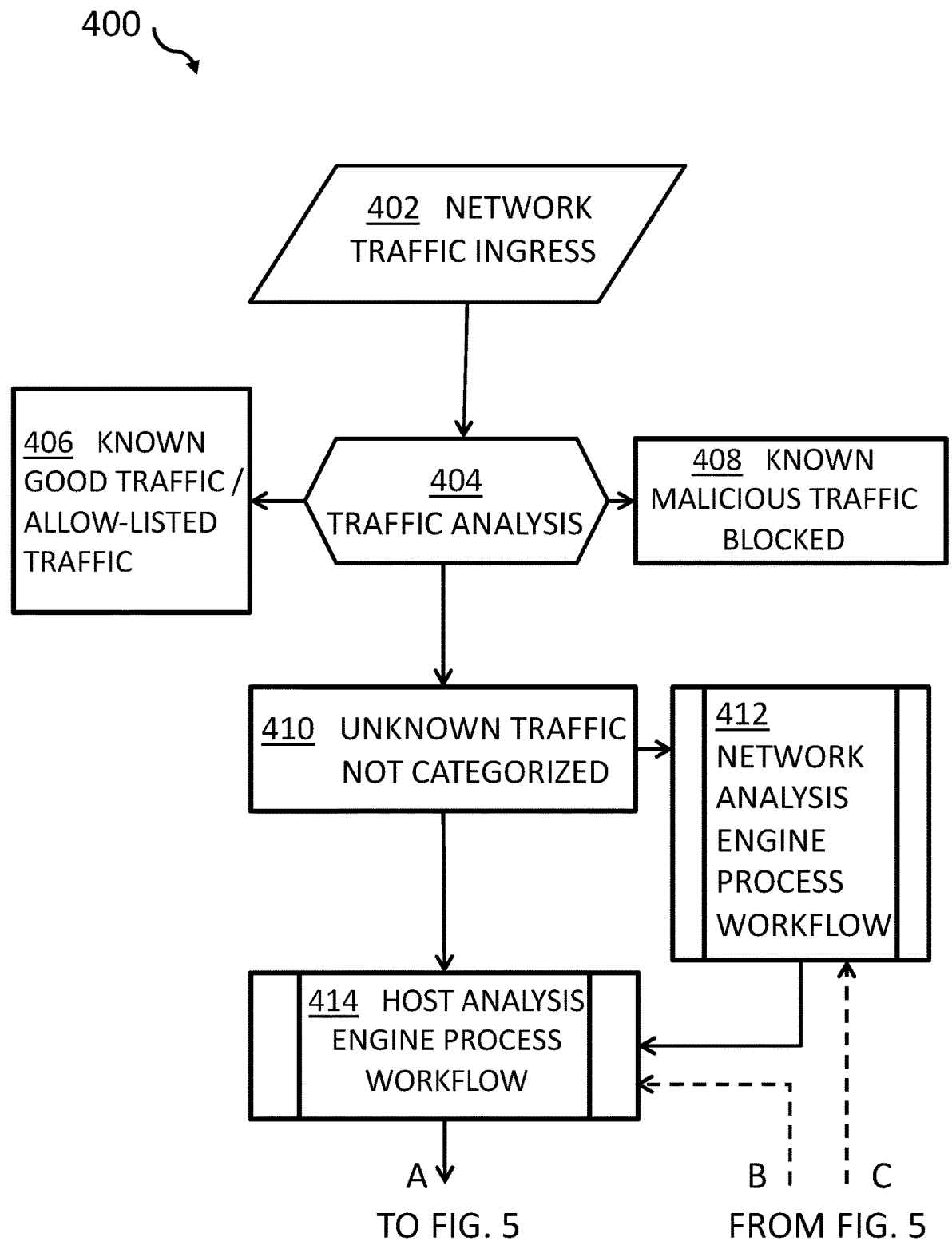
FIG. 4 depicts a first portion of a more detailed exemplary flow chart of a proposed concept, in accordance with embodiments of the present invention.

FIG. 4 shows flowchart 400, a first portion of a more detailed exemplary flowchart of embodiments of the present invention. Firstly, the inbound network traffic 402 undergoes a traffic analysis 404. Here, embodiments of the present invention, utilizing flowchart 400 can determine a three-fold decision on whether received data belongs to known, good traffic/allow-listed traffic 406 (left branch), known malicious traffic 408, which may be blocked immediately (right branch), and unknown traffic 410, leaving traffic analysis 404 at the bottom. The unknown traffic cannot be categorized directly as good or bad (in unknown traffic 410). The unknown traffic can then feed into the sub-process 412, "network analysis engine process workflow," as well as (via a packet cache) to the sub-process 414, "host analysis engine process workflow." Additionally, if the deep packet analysis of sub-process 412 confirms non-malicious traffic, then the information is forwarded to the host analysis engine process workflow 414. The process flow continues on FIG. 5. The flowcharts of FIG. 4 and FIG. 5 are linked by the connections "A," "B," and "C."

Figure 5:
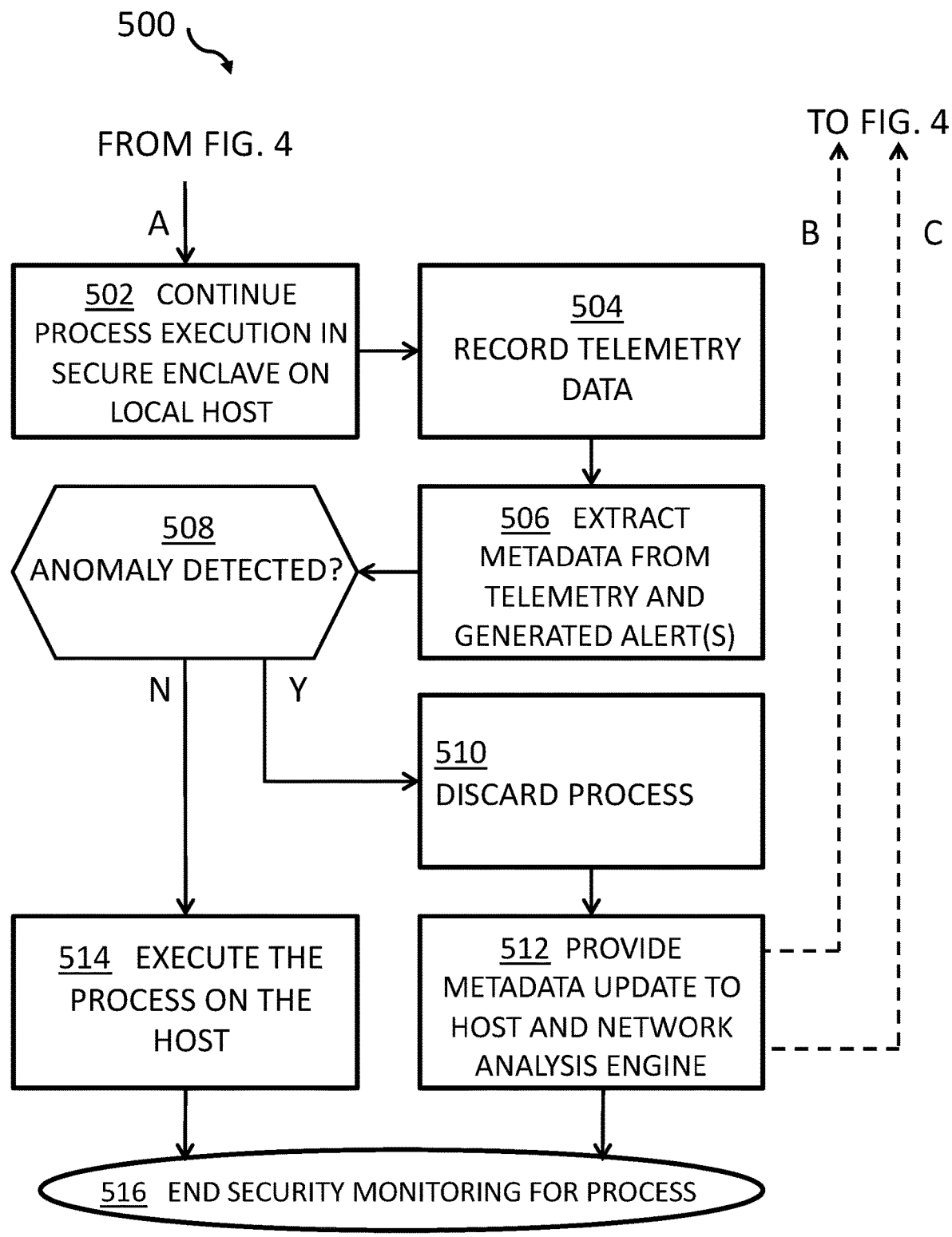
FIG. 5 depicts a second portion of a more detailed exemplary flow chart of the proposed concept, in accordance with embodiments of the present invention.

FIG. 5 shows flowchart 500, a second portion of the more detailed exemplary flowchart of embodiments of the present invention. The process flow continues at "A" from FIG. 4. The host analysis engine process workflow 414 (compare FIG. 4) allows a process execution in a secure enclave (i.e., a secure sandbox execution environment) in process 502, after a confirmation from the network analysis engine (FIG. 4, process 412).

Then, flowchart 500 initiates process 504, the recording of telemetry data, during which embodiments of the present invention can perform process 506, an extraction of metadata from the telemetry data and generated alerts. Flowchart 500 continues with process 508, the determination of whether an anomaly has been detected. If an anomaly is detected (process 508, "Y" branch), then the process is discarded (in process 510), and the related data are deleted. In addition, flowchart 500 includes process 512, to transfer the collected metadata, in an updated form, to the host and network engine and analysis process along the connections "B" and "C" back to FIG. 4.

If the determination in process 508 shows that no anomalies (i.e., no malicious code/data) have been detected (process 508, "N" branch), then flowchart 500 proceeds to process 514, to execute the process on the host in a regular way. Then, the security monitoring for a specific process ends (process 516).

Figure 6:
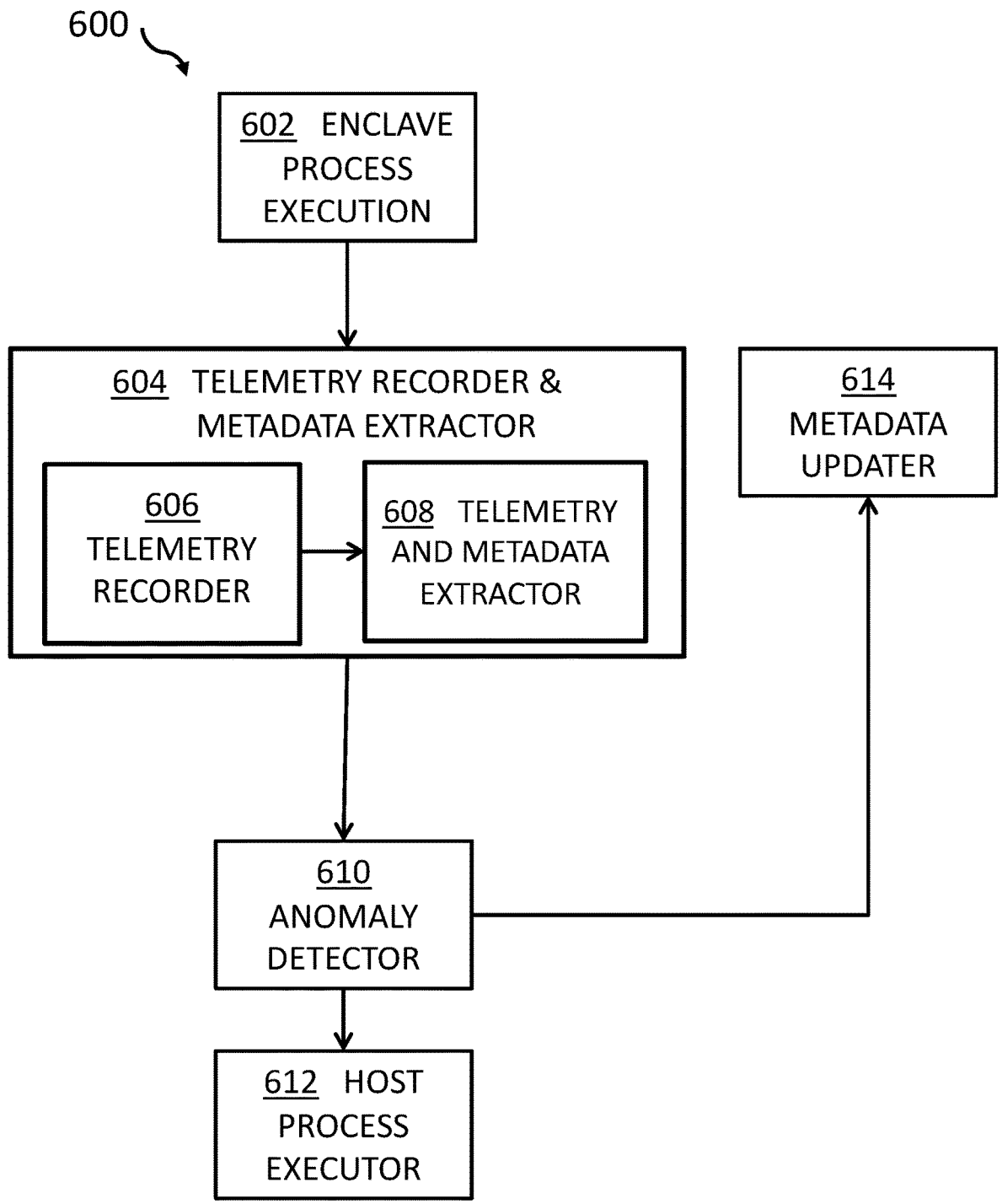
FIG. 6 depicts a block diagram of an embodiment of components of the here proposed concept and respective dependencies, in accordance with embodiments of the present invention.

FIG. 6 shows a block diagram of an embodiment of components 600 of various aspects of the present invention. In response to executing the unclassifiable process (enclave process execution 602) as a secure enclave process, the telemetry recorder and metadata extractor 604 collects the generated data from the enclave process execution 602. Firstly, a telemetry recorder 606 collects the data and hands the data over to the telemetry and metadata extractor module 608. Then, telemetry recorder and metadata extractor 604 can forward the data to the anomaly detectors 610, from which the data can proceed (via forwarding) to the metadata updater 614.

If the data is forwarded to metadata updater 614, then the process is automatically discarded and the related process output data are deleted. In the other case, the host process executor 612 starts. However, the host process executor 612 is only activated if the anomaly detector 610 confirms a non-malicious process.

Figure 7:
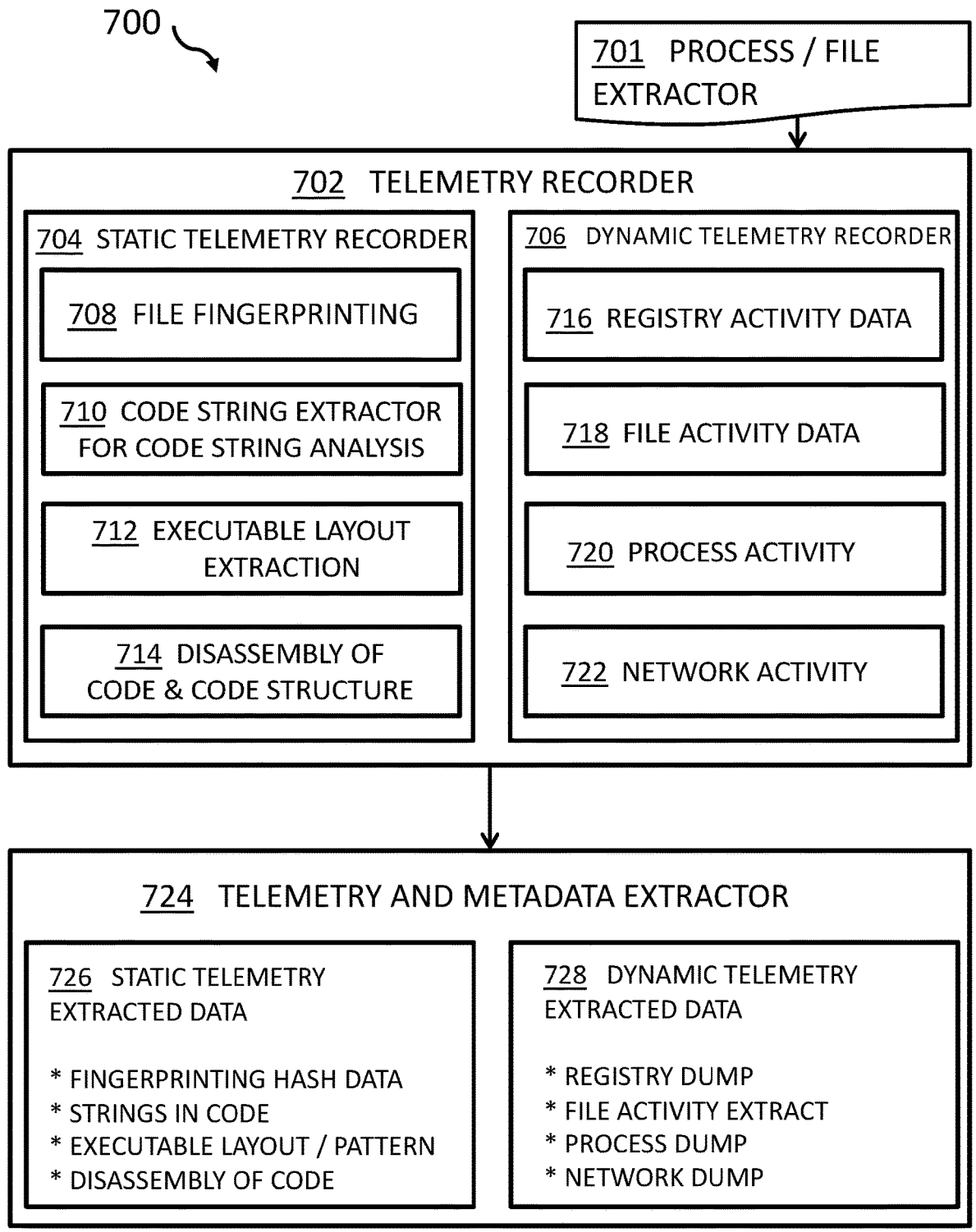
FIG. 7 depicts a block diagram of an embodiment illustrating a process to generate telemetry and metadata for a given process to be examined, in accordance with embodiments of the present invention.

FIG. 7 shows a block diagram of an embodiment 700 illustrating a process to generate telemetry and metadata for a given process to be examined, in accordance with various embodiments of the present invention. Telemetry recorder 702 can receive the data from the process/file extractor 701. The telemetry recorder 702 works in two steps to record the executable process and other relevant data with a static telemetry (TM) recorder 704 and dynamic telemetry recorder 706. The static telemetry recorder 704 records the content directly retrieved before the process/code execution, which may comprise at least the following: (i) a determined file hash value (e.g., file fingerprinting 708), of the executable file to fingerprint the files; (ii) code string extraction for code string analysis 710, from the executable file; (iii) executable layout extraction 712, of the executable file; and (iv) an automated disassembly of code and code structure 714, of the executable file.

In addition, the dynamic telemetry recorder 706 records the content retrieved capturing/code execution. The recording includes at least a capturing and recording of: (i) system monitoring data; (ii) registry activity data 716; (iii) file activity data 718 (i.e., file access); (iv) process activity data 720; (v) and, network activity data 722.

As a result, the telemetry (TM) and metadata extractor 724 may provide static telemetry extracted data 726 comprising fingerprint hash data, strings in the code, executable layout/pattern and disassembly information of the program code of the executable file. On the other side, the dynamic telemetry extracted data 728 comprises an exemplary registry dump, a file activity extract, a process dump, and a network dump. For both, the static telemetry recorder 704 as well as for the dynamic telemetry recorder 706 partially, can be reused (and also known technology, if applicable).

Figure 8:
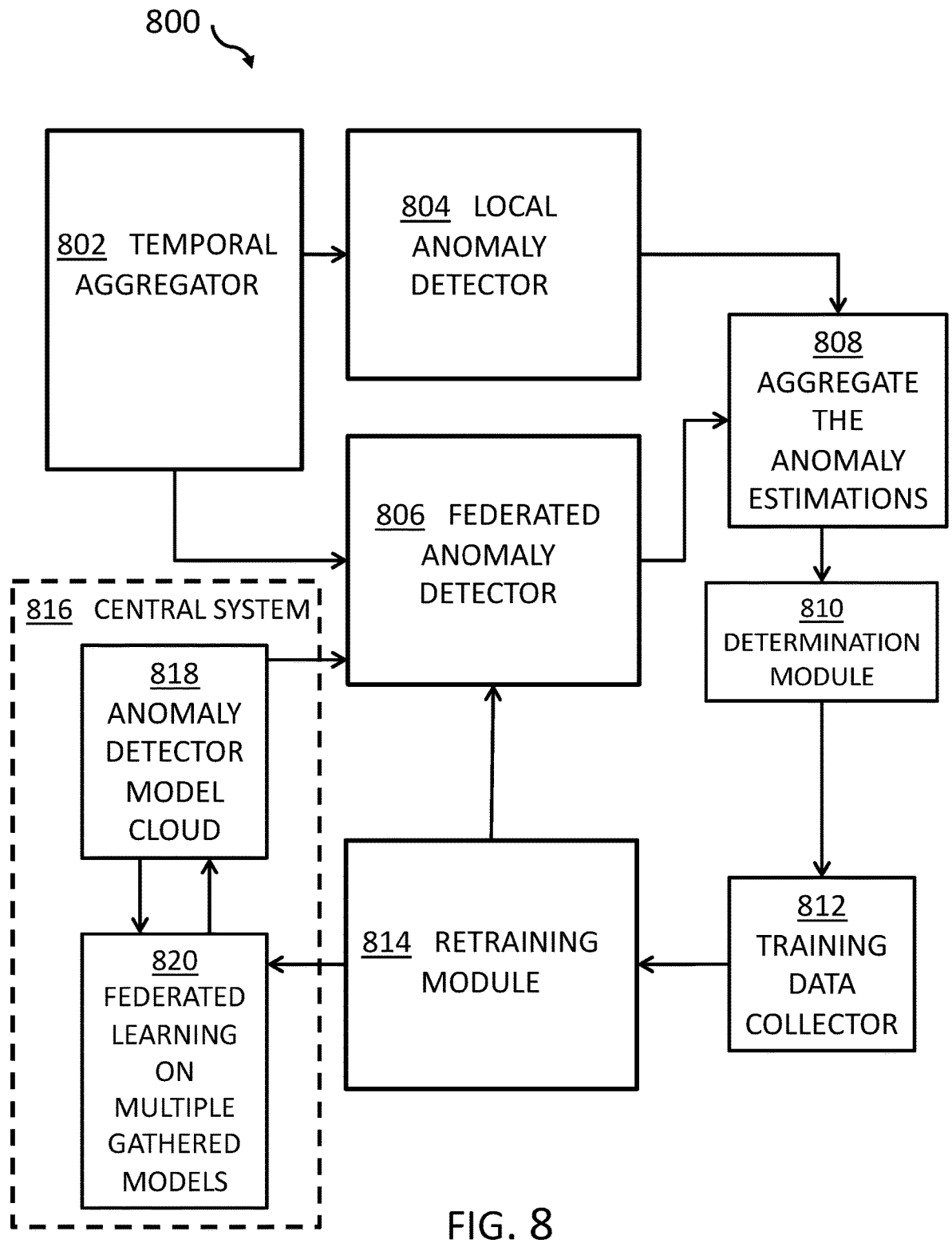
FIG. 8 depicts a block diagram of an embodiment illustrating partial processes for anomaly detection including a user of trained neural network modules, in accordance with embodiments of the present invention.

FIG. 8 shows a block diagram of an embodiment illustrating sub-processes 800, for anomaly detection including a use of the trained neural network modules, in accordance with various embodiments of the present invention. In various embodiments, the main components associated with execution of sub-processes 8—include the local anomaly detector 804 (i.e., the local trained neural network system), the federated anomaly detector 806 (i.e., the federated trained neural network system), the training data collector 812, the retraining module 814, the federated learning on multiple gathered models unit 820, and the provided anomaly detector model (e.g., provided as a cloud service, such as anomaly detector model cloud 818); the last two components being part of a central service or central system 816.

The telemetry data stream enters the temporal aggregator 802. For example, temporal aggregator 802 aggregates the data stream for "n" seconds before sending the data to the next module, the local anomaly detector 804 (e.g., in the form of an auto-encoder). In parallel, the aggregated telemetry data are also parsed to the federated anomaly detector 806 (e.g., also in form of an auto-encoder). In block 808, both results are aggregated to form the anomaly estimations. A determination module 810 determines whether the condition "anomaly true" or "anomaly false" is met.

Then, the telemetry data can proceed (e.g., via forwarding) to the training data collector 812, which in turn passes the telemetry data to the retraining module 814. The retraining module 814 may be instrumental to train the local train neural network model (i.e. the local anomaly detector 804) on a regular basis (e.g., every day, every couple of hours or according to any other timing scheme). Alternatively, the retraining may also be initiated by a predefined trigger mechanism. Furthermore, the retraining module 814 pulses the telemetry data to a central system 816, which can comprise the (cloud-based) federated anomaly detector or anomaly detector model cloud 818. In addition, the anomaly detector model cloud 818 can be retrained using federated learning on multiple gathered models unit 820, based on multiple gathered neural network models from different hosts from which the local trained neural network models are used.

Thus, various embodiments of the present invention recognize that the advantage of having both the federated and the local anomaly detector is not only in terms of resource consumption, but also in terms of data used for training. Indeed, the federated learning auto-encoder is exposed to data from all instances of the anti-malware systems around the environment and the federated learning auto-encoder learns on the data without transferring any information directly to the auto-encoder of the single instances. The transfer of the knowledge of the different instances is enclosed in the federated trained neural network model, which is then transferred periodically to the neural network system of the federated anomaly detector in the local hosts.

During training, the auto-encoder is exposed to the aggregated telemetry data as input and output and the auto-encoder learns to reproduce the aggregated telemetry data (because of the auto-encoder functionality). Typical loss functions that are used are mean square error functions (MSE).

During inference (i.e., usage of the model in the process shown in FIG. 8), the local and the federated auto-encoders are used with the current telemetry data extracted from unknown code executed in the secure enclave. Then, the same MSE metric is computed between the reconstructed data and the original data for both the auto-encoders independently. Values are then aggregated as follows: For both auto-encoders (AE) results are determined by: $m_{AE}=MSE_{current}-(MSE_{current}-during\ training)/sf$, wherein as "sf" is a sensitivity factor.

If the resulting value is negative for the AEs, then no anomaly is detected. Else, the margins $m_{AE}$ are combined by weighted average, e.g., $m_{AE}+w_{fed}*m_{AE,fed}$. The weight $w_{fed}$ can depend on the amount of data seen by the federated AE versus the local AE. In one embodiment, a linear dependency is used so that the federated AE, which learns from more data, will have a higher weight value. As a fourth step, if $M_{AE,loc}+W_{fed}*m_{AE,fed}$ is positive, then an anomaly is identified and the process under investigation is discarded; else, the process is not anomalous and the telemetry data is passed on to the training data collector, as described above.

It should also be mentioned, that the training data collectors stores all telemetry data that passes through the detectors and are classified as regular. Periodically, the training data collectors sends a badge of data to the retraining module.

The retraining module retreats the training of the AE with the incoming telemetry data from the training data collector. For example, a typical period is one day. Various embodiments of the present invention can utilize conditions based on the improvement of the neural network model performance during training to automatically decide when the training is complete. In an example, a preferred condition is early stopping. Once the model training completes, the model of the local AE is replaced by the new model, and the new model is sent to the federated learning module. The federated learning on multiple gathered models which runs in a central computing location (e.g., as a cloud service) receives the set of new models on a regular basis (time period configurable) and merges the incoming models, in order to avoid forgetting of the single local neural network models (or local anomaly detector knowledge).

In various aspects, the process in order to ensure accurate utilization of the single local neural network models (or local anomaly detector knowledge) includes the following. Firstly, the set of representatively generated telemetry data is processed through each single collected local trained neural network system and the opposite is stored. The output will encode the experience of the single machine learning models. Secondly, the pairs (input/output of the AE) generated by the single models are taken and the federated neural network model is trained with these data pairs. Once the training is complete, the new federated trained neural network model is sent to the anomaly detector model cloud 818, which then pushes the new federated trained neural network model to all federated anomaly detectors on the local hosts. The federated anomaly detectors can receive the new model and can replace the model at an appropriate moment.

In one example embodiment, a single value for the sensitivity factor of the federated AE is assigned based on the true/false positive ratio observed by a security analyst. In a modified example embodiment, the sensitivity factor $sf_{loc}$ on the local AEs are adjusted based on the combination of the following automatically observed parameters. A first parameter can be an amount of local telemetry measurements process to build the local model (e.g., for relatively new servers a few samples describing normal behavior were built into the model which may trigger easily false alarms (detect malicious processes from malware)). For example, the sensitivity factors can be set to very low value close to zero.

A second parameter can be a variation of the local telemetry measurements process to build the local model. For example, servers with a specific purpose may receive a specific set of input describing the normal behavior resulting in a biased model. To avoid false positive alarms, a lower $sf_{loc}$ is assigned for a small variance σ. The servers receiving a wider set of telemetry data built a more balanced model. Here, a value close to one is assigned to $sf_{loc}$ for large variance σ.

The variance of the telemetry input data may be defined as:

$$\sigma^2 = \frac{1}{n}\sum_{i=1}^{n}\left(\begin{pmatrix}a_i\\b_i\\c_i\end{pmatrix}-\begin{pmatrix}\bar{a}_i\\\bar{b}_i\\\bar{c}_i\end{pmatrix}\right)^2$$

Here, "n" is the number of telemetry data measurements (n>1). The first vector $(a_i, b_i, c_i, \ldots)$ represents the actual telemetry data measurement values and the second vector the (locally on the individual host) average telemetry data measurements. The sensitivity factors defined by the variance by $$sf = 1 - \frac{1}{\sqrt{\sigma+1}}$$

A third parameter can be an amount of overlap between the federated model and local model (compare FIG. 2). The overlap is determined by the enriching the result $m_{AE,loc}-m_{AE,fed}|$ over the investigated cases. For a large overlap, a sensitivity factor $sf_{loc}$ close to zero is assigned (host is common host), for a small overlap (especially, in combination with small variance of telemetry data measurements), a low value is assigned to the sensitivity factor $sf_{loc}$.

Figure 9:
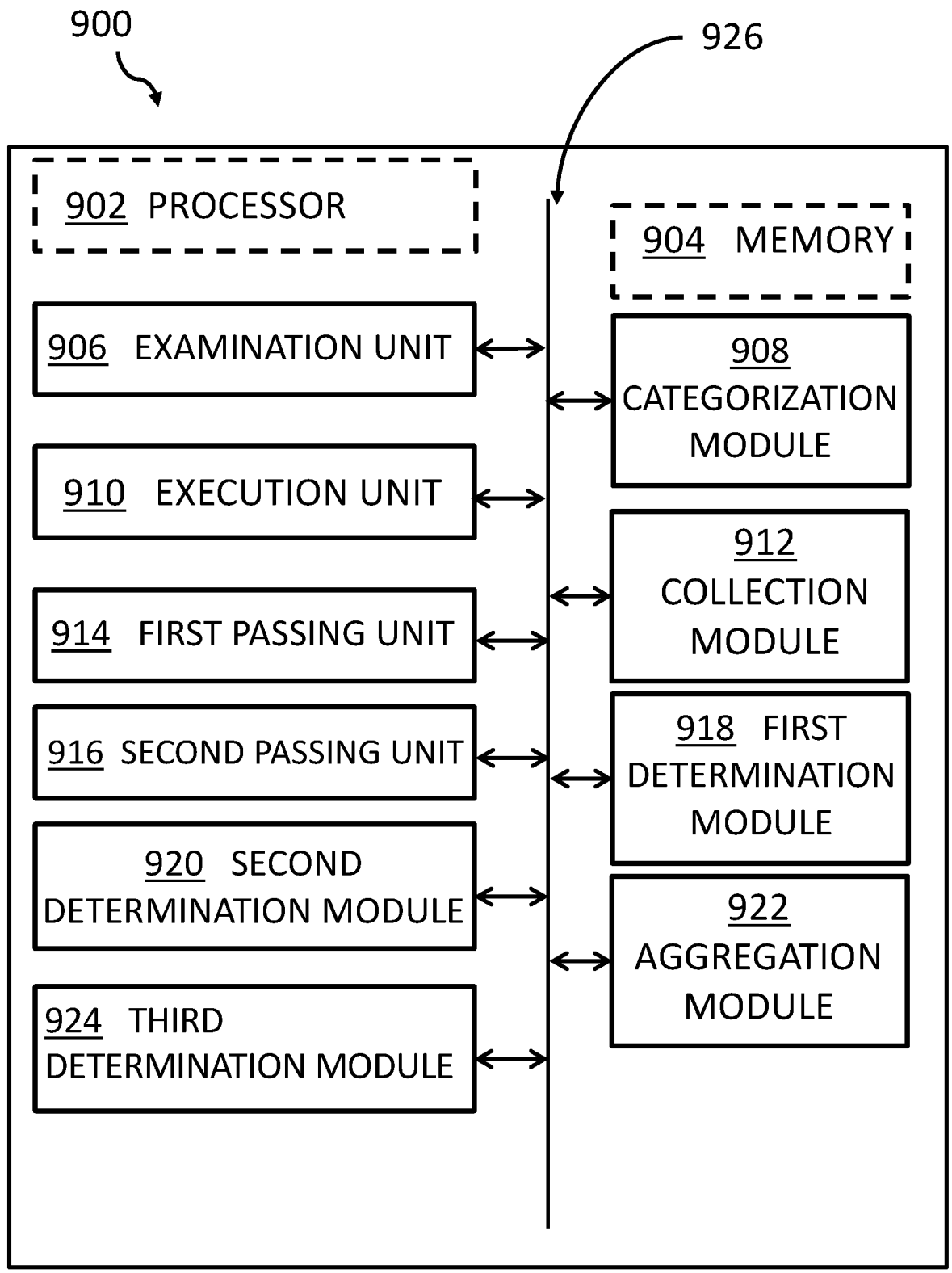
FIG. 9 depicts a block diagram of an embodiment of the proposed malware detection system, in accordance with embodiments of the present invention.

FIG. 9 shows a block diagram of an embodiment of the proposed malware detection system 900, in accordance with various aspects of the present invention. The malware detection system 900 comprises a memory and a processor 902 communicatively coupled to said memory 904, wherein the processor 902, using program code stored in the memory 904, is configured to examine (in particular by an examination unit 906) a process for indicators of compromise, and categorize, based upon a result of the examination unit 906 (in particular by a categorization module 908) the process as one selected out of the group comprising a known benevolent process, a known malicious process, and an unknown process.

The processor 902, using program code stored in the memory 904, is further configured to execute (in particular by an execution unit 910) the process in a secure enclave in case the process is neither categorized as a known benevolent process nor as a known malicious process, and collect (in particular by a collection module 912) telemetry data from the executing process.

Moreover, the processor 902, using program code stored in the memory 904, is also configured to pass (in particular by a first passing unit 914) the collected telemetry data to a locally trained neural network system, where training data of the locally trained neural network system comprise telemetry data from processes being executed on a host system underlying the local instance, and pass (in particular by the second passing unit 916) the collected telemetry data to a federated trained neural network system, where the federated trained neural network system is adapted to receive a federated trained neural network model.

Additionally, the processor 902, using program code stored in the memory 904, is also configured to determine (in particular, by the first determination module 918) a result of a first loss function for the locally trained neural network system and comparing the result with a result of the loss function at an end of a training of the locally trained neural network system, and determine (in particular, by the second determination module 920) a result of a second loss function for the federated trained neural network system and comparing the result with a result of the loss function of the received federated trained neural network model of the federated trained neural network system.

Last but not least, the processor 902, using program code stored in the memory 904, is also configured to aggregate (in particular by the aggregation module 922) the results of the first and second loss function, and determine (in particular by the third determination module 924) whether the process is anomalous based on the aggregated results.

It should also be mentioned, that all units and modules may also be implemented as hardware units and modules and that the units are communicatively coupled to each other for signal and data exchange. Alternatively, to the one-to-one communication schema, the units and modules can also be connected to a malware detection system internal bus system 926 (i.e., the processor 902, the memory 904, the examination unit 906, the categorization module 908, the execution unit 910, the collection module 912, the first passing unit 914, the second passing unit 916, the first determination module 918, the second determination module 920, the aggregation module 922, and the third determination module may all be connected to the malware detection system internal bus system 926 for signal and data exchange).

Figure 10:
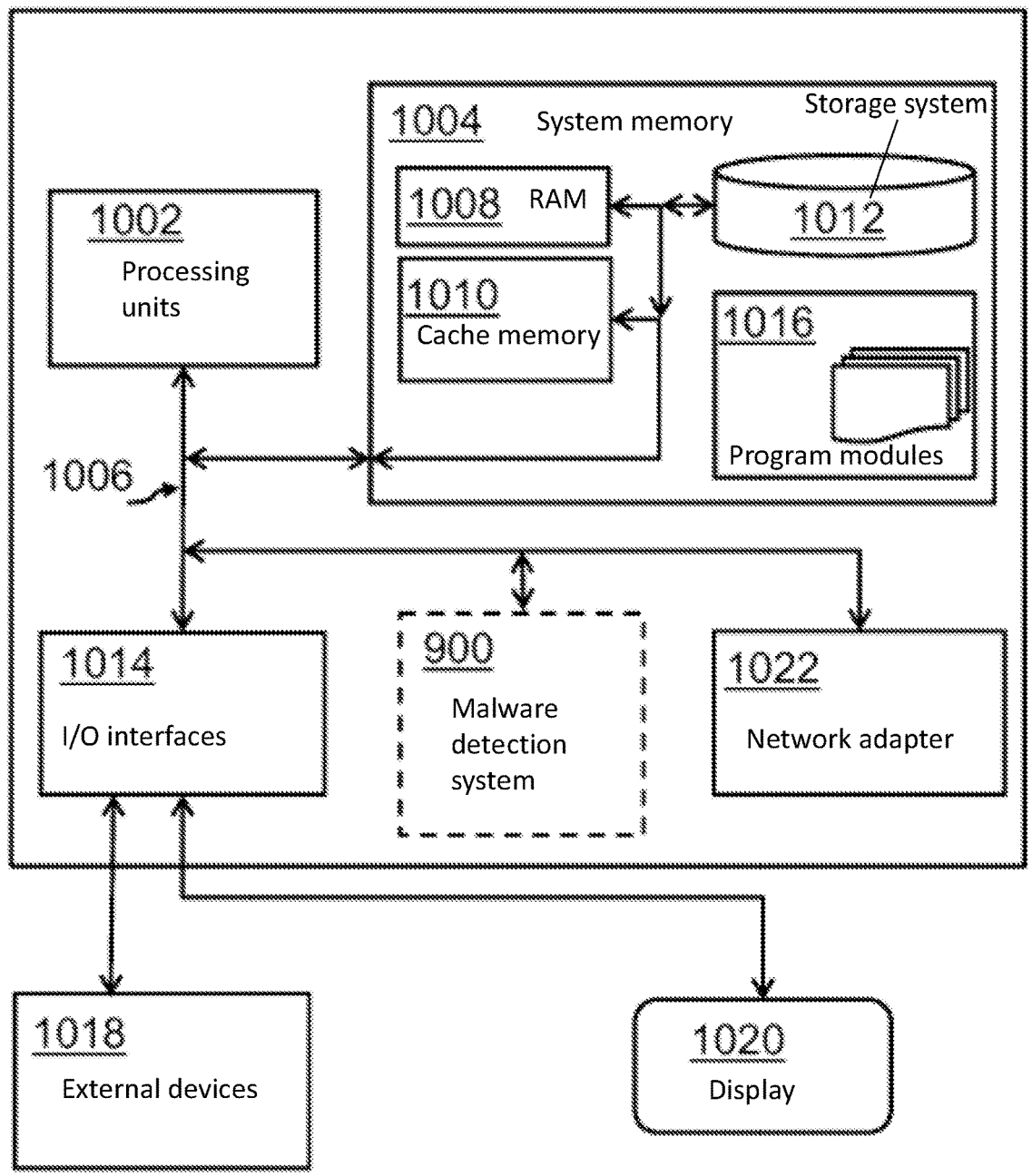
FIG. 10 depicts a block diagram of an embodiment of a computing system comprising the proposed malware detection system according to FIG. 9, in accordance with embodiments of the present invention.

Embodiments of the invention may be implemented together with virtually any type of computer, regardless of the platform being suitable for storing and/or executing program code. FIG. 10 shows, as an example, a computing system 1000 suitable for executing program code related to the proposed method, in accordance with various embodiments of the present invention.

The computing system 1000 is only one example of a suitable computer system, and is not intended to suggest any limitation as to the scope of use or functionality of embodiments of the invention described herein, regardless, whether the computer system 1000 is capable of being implemented and/or performing any of the functionality set forth hereinabove. In the computer system 1000, there are components, which are operational with numerous other general-purpose or special-purpose computing system environments or configurations. Examples of well-known computing systems, environments, and/or configurations that may be suitable for use with computer system 1000 (e.g., a server) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system 1000 (e.g., a server) may be described in the general context of computer system-executable instructions, such as program modules, being executed by a computer system 1000. Generally, program modules may include routines, programs, objects, components, logic, data structures, and so on that perform particular tasks or implement particular abstract data types. Computer system 1000 (e.g., a server) may be practiced in distributed cloud computing environments where tasks are performed by remote processing devices that are linked through a communications network. In a distributed cloud computing environment, program modules may be located in both, local and remote computer system storage media, including memory storage devices.

As shown in FIG. 10, computer system 1000 (e.g., a server) is shown in the form of a general-purpose computing device. The components of computer system 1000 (e.g., a server) may include, but are not limited to, one or more processors or processing units 1002, a system memory 1004, and a bus 1006 that couple various system components including system memory 1004 to the processing units 1002. Bus 1006 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system 1000 (e.g., a server) typically includes a variety of computer system readable media. Such media may be any available media that is accessible by computer system 1000 (e.g., a server), and it includes both, volatile and non-volatile media, removable and non-removable media.

The system memory 1004 may include computer system readable media in the form of volatile memory, such as random-access memory (RAM) 1008 and/or cache memory 1010. Computer system 1000 (e.g., a server) may further include other removable/non-removable, volatile/non-volatile computer system storage media. By way of example only, a storage system 1012 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1006 by one or more data media interfaces. As will be further depicted and described below, memory 1004 may include at least one program product having a set (e.g., at least one) of program modules that are configured to carry out the functions of embodiments of the invention.

The program/utility, having a set (at least one) of program modules 1016, may be stored in memory 1004 by way of example, and not limiting, as well as an operating system, one or more application programs, other program modules, and program data. Each of the operating systems, one or more application programs, other program modules, and program data or some combination thereof, may include an implementation of a networking environment. Program modules 1016 generally carry out the functions and/or methodologies of embodiments of the invention, as described herein.

The computer system 1000 (e.g., a server) may also communicate with one or more external devices 1018 such as a keyboard, a pointing device, a display 1020, etc.; one or more devices that enable a user to interact with computer system 1000 (e.g., a server); and/or any devices (e.g., network card, modem, etc.) that enable computer system 1000 (e.g., a server) to communicate with one or more other computing devices. Such communication can occur via Input/Output (I/O) interfaces 1014. Still yet, computer system 1000 (e.g., a server) may communicate with one or more networks such as a local area network (LAN), a general wide area network (WAN), and/or a public network (e.g., the Internet) via network adapter 1022. As depicted, network adapter 1022 may communicate with the other components of computer system 1000 (e.g., a server) via bus 1006. It should be understood that, although not shown, other hardware and/or software components could be used in conjunction computer system 1000 (e.g., a server). Examples, include, but are not limited to: microcode, device drivers, redundant processing units, external disk drive arrays, RAID systems, tape drives, and data archival storage systems, etc.

Additionally, the malware detection system 900 for detecting a malicious process by a selected instance of an anti-malware system may be attached to the bus 1006.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   examining, by one or more processors, a process for indicators of compromise to the process;
   determining, by the one or more processors, a categorization of the process based upon a result of the examination;
   in response to determining that the categorization of the process does not correspond to a known benevolent process and a known malicious process, executing, by the one or more processors, the process in a secure enclave on a local host system;
   collecting, by the one or more processors, telemetry data from executing the process in the secure enclave;
   passing, by the one or more processors, the collected telemetry data from the secure enclave to a locally trained neural network system and a federated trained neural network system, wherein training data of the locally trained neural network system comprises other telemetry data from processes being executed on the local host system underlying the locally trained neural network system;
   determining, by the one or more processors, a result of a first loss function for the locally trained neural network system;
   comparing, by the one or more processors, the result of the first loss function for the locally trained neural network system with a result of a loss function at an end of a training of said locally trained neural network system;
   aggregating, by the one or more processors, the result of the first loss function and a result of a second loss function for the federated trained neural network system that is trained differently than the locally trained neural network system; and
   determining, by the one or more processors, whether the process is anomalous based on the aggregated results.

2. The method of claim 1, wherein the federated trained neural network system is adapted to receive a federated trained neural network model; and further comprising:
   determining, by the one or more processors, the result of the second loss function for the federated trained neural network system;
   and comparing, by the one or more processors, the result of the second loss function for the federated trained neural network system with a result of a loss function of the received federated trained neural network model of the federated trained neural network system.

3. The method of claim 1, further comprising: collecting, by the one or more processors, telemetry data of non-malicious processes being executed on a selected instance of an anti-malware system; and retraining, by the one or more processors, the locally trained neural network system with the collected telemetry data to build an updated local neural network model on a regular basis.

4. The method of claim 2, further comprising: receiving, by the one or more processors, an updated federated neural network model for the federated neural network system, wherein the federated neural network model is built using locally trained neural network models of a plurality of selected instances as input.

5. The method of claim 2, wherein at least one of the locally trained neural network systems and the federated trained neural network system is an auto-encoder system.

6. The method of claim 1, further comprising: in response to determining that the categorization of the process corresponds to an anomalous process, discarding, by the one or more processors, the process.

7. The method of claim 1, further comprising: in response to determining that the process is a regular process, based on execution in the secure enclave, moving, by the one or more processors, the process out of the secure enclave; and executing, by the one or more processors, the process as a regular process.

8. The method of claim 2, wherein the federated trained neural network system is trained with telemetry data from a plurality of hosts.

9. The method of claim 8, wherein training of the federated neural network system further comprises: processing, by the one or more processors, by each of a plurality of received locally trained neural network models, a set of representative telemetry data and storing respective results; and training, by the one or more processors, the federated neural network using input/output pairs of telemetry data used and generated during processing of the representative telemetry data as input data for a training of the federated neural network model.

10. The method of claim 9, wherein the input/output pairs of telemetry data used for the training of the federated neural network model are weighted depending on a geographical vicinity between geographical host locations of the local received neural network models and a geographical host location for which a new federated neural network model is trained, and wherein the input/output pairs of telemetry data used for the training of said federated neural network model are weighted depending on a predefined metric.

11. The method of claim 2, wherein the aggregating comprises: building, by the one or more processors, a weighted average of the first loss function and the second loss function.

12. The method of claim 1, wherein the determined categorization is selected from a group consisting of: a known benevolent process, a known malicious process, and an unknown process.

13. A computer system comprising: one or more computer processors; one or more computer readable storage media; and program instructions stored on the computer readable storage media for execution by at least one of the one or more processors, the program instructions comprising:
program instructions to examine a process for indicators of compromise to the process;
program instructions to determine a categorization of the process based upon a result of the examination;
in response to determining that the categorization of the process does not correspond to a known benevolent process and a known malicious process, program instructions to execute the process in a secure enclave on a local host computer;
program instructions to collect telemetry data from executing the process in the secure enclave;
program instructions to pass the collected telemetry data from the secure enclave to a locally trained neural network process and a federated trained neural network process, wherein training data of the locally trained neural network process comprises other telemetry data from processes being executed on the local host computer underlying the locally trained neural network process;
program instructions to determine a result of a first loss function for the locally trained neural network process;
program instructions to compare the result of the first loss function for the locally trained neural network process with a result of a loss function at an end of a training of said locally trained neural network process;
program instructions to aggregate the result of the first loss function and a result of a second loss function for the federated trained neural network process that is trained differently than the locally trained neural network process; and
program instructions to determine whether the process is anomalous based on the aggregated results.

14. The computer system of claim 13, wherein the federated trained neural network process is adapted to receive a federated trained neural network model; and further comprising program instructions, stored on the computer readable storage media for execution by at least one of the one or more processors, to:
determine the result of the second loss function for the federated trained neural network process; and
compare the result of the second loss function for the federated trained neural network process with a result of the loss function of the received federated trained neural network model of the federated trained neural network process.

15. The computer system of claim 13, further comprising program instructions, stored on the computer readable storage media for execution by at least one of the one or more processors, to: collect telemetry data of non-malicious processes being executed on a selected instance of an anti-malware process; and retrain the locally trained neural network process with the collected telemetry data to build an updated local neural network model on a regular basis.

16. The computer system of claim 13, further comprising program instructions, stored on the computer readable storage media for execution by at least one of the one or more processors, to: in response to determining that the categorization of the process corresponds to an anomalous process, discard the process.

17. The computer system of claim 13, further comprising program instructions, stored on the computer readable storage media for execution by at least one of the one or more processors, to: in response to determining that the process is a regular process, based on execution in the secure enclave, move the process out of the secure enclave; and execute the process as a regular process.

18. The computer system of claim 14, wherein the federated trained neural network system is trained with telemetry data from a plurality of hosts.

19. A computer program product comprising: one or more computer readable storage media and program instructions stored on the one or more computer readable storage media, the program instructions comprising:
program instructions to examine a process for indicators of compromise to the process;
program instructions to determine a categorization of the process based upon a result of the examination;
in response to determining that the categorization of the process does not correspond to a known benevolent process and a known malicious process, program instructions to execute the process in a secure enclave on a local host computer;
program instructions to collect telemetry data from executing the process in the secure enclave;
program instructions to pass the collected telemetry data from the secure enclave to a locally trained neural network process and a federated trained neural network process, wherein training data of the locally trained neural network system comprises other telemetry data from processes being executed on the local host computer underlying the locally trained neural network process;
program instructions to determine a result of a first loss function for the locally trained neural network process;

program instructions to compare the result of the first loss function for the locally trained neural network process with a result of a loss function at an end of a training of said locally trained neural network process;

program instructions to aggregate the result of the first loss function and a result of a second loss function for the federated trained neural network process that is trained differently than the locally trained network process; and program instructions to determine whether the process is anomalous based on the aggregated results.

20. The computer program product of claim 19, wherein the federated trained neural network process is adapted to receive a federated trained neural network model; and further comprising program instructions, stored on the one or more computer readable storage media, to:

determine the result of the second loss function for the federated trained neural network process; and compare the result of the second loss function for the federated trained neural network system with a result of a loss function of the received federated trained neural network model of the federated trained neural network process.

\* \* \* \* \*